UNITED STATES PATENT OFFICE.

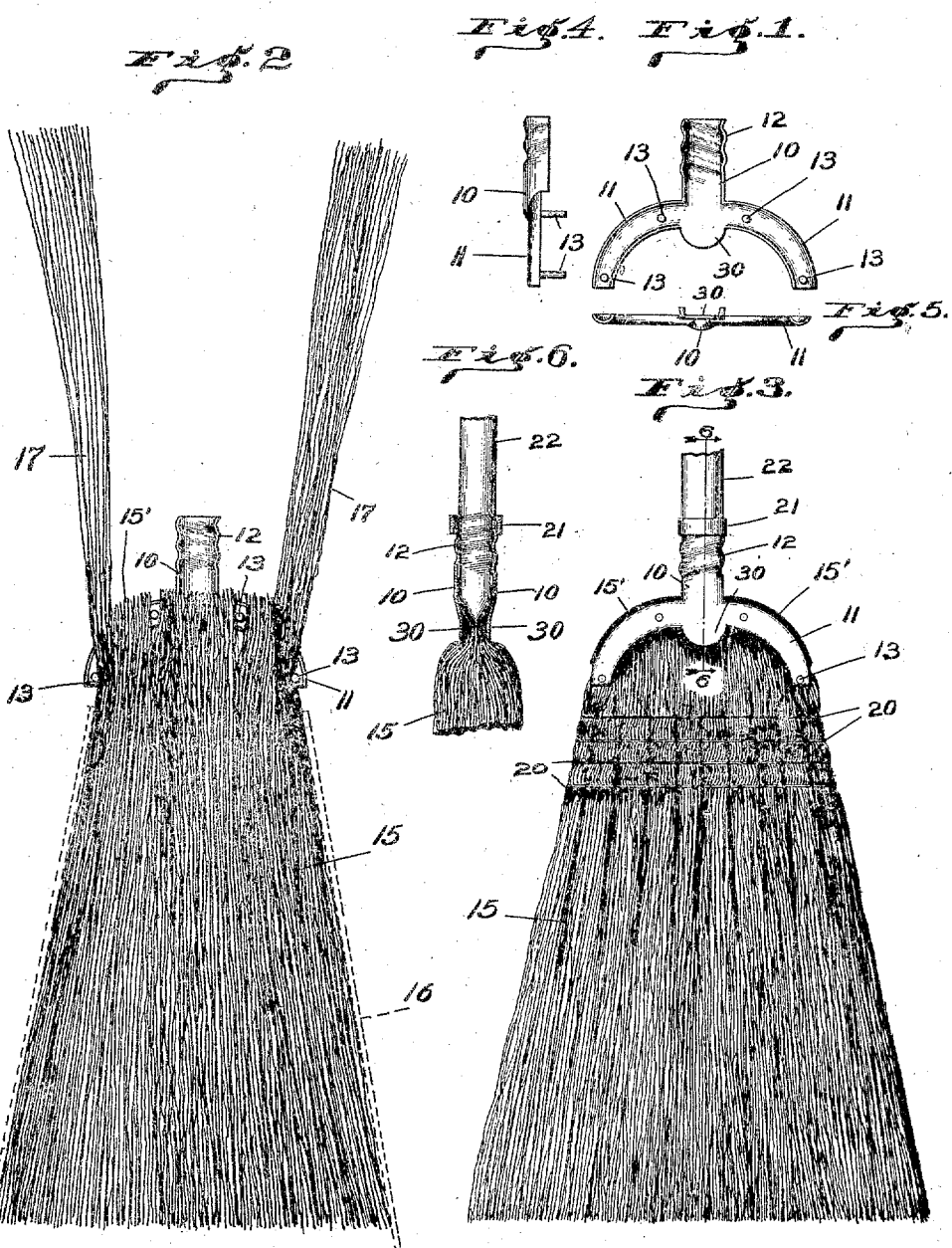

ANDREW J. COCHRAN, OF INDIANAPOLIS, INDIANA.

BROOM.

No. 852,772.  Specification of Letters Patent.  Patented May 7, 1907.

Application filed June 19, 1906. Serial No. 322,385.

*To all whom it may concern:*

Be it known that I, ANDREW J. COCHRAN, a citizen of the United States, residing at Indianapolis, in the county of Marion and State of Indiana, have invented certain new and useful Improvements in Brooms, of which the following is a specification.

The object of my invention is to produce a light broom, the parts being of such form and the method of construction being such that short tip ends of broomcorn, may be successfully used, thereby producing a very light and soft floor broom.

The accompanying drawings illustrate my invention:

Figure 1 is an elevation of one of the half-head fittings; Fig. 2 illustrates the first step of my method; Fig. 3 a finished broom; Fig. 4 a side elevation of the fitting; Fig. 5 an end elevation and Fig. 6 a section on line 6 of Fig. 3.

To this end I provide for each broom a pair of metal members, such as that shown in Figs. 1, 4 and 5, preferably formed of sheet steel pressed into form. Each of these members comprises a substantial semi-cylindrical stem 10 which, at its inner end, merges into a pair of diverging hollow fingers 11—11. At its outer end stem 10 is provided with threads 12 to receive a handle 22. Each of the arms 11 is perforated to receive rivets 13 one of said rivets being arranged close to the end of each finger 11. Opposite the inner end of stem 10 I provide an inturned lip 30, the purpose of which will appear.

The method of construction is as follows: A member 10—11, with the rivets 13 assembled therein, is laid on a table with its hollow side uppermost and a mass of broomcorn 15 laid thereon, being generally laid in position in a suitable form 16 (indicated in dotted lines in Fig. 2), the butt ends of the corn extending over the arms 11 11. A wisp 17 of broomcorn is then laid immediately inside of each end rivet 13 with the butt ends lying across the arms 11 in the direction opposite to that of the corn 15. Thereupon a second fitting 10—11 is laid upon the first with the rivets 13 passing therethrough and the parts are subjected to a slight pressure. The wisps 17—17 are then turned downward and the two fittings 10—11 are then forced together with a very considerable amount of pressure so as to clamp the butt ends of the corn 15 very tightly between the two fittings, whereupon the rivets 13 are headed over so as to hold the parts together. Thereupon the soft ends of the wisps 17 are swung further toward the main body 15 and the corn is sewed together by the stitches 20 in the usual well known manner. The butt ends 15' of the corn 15 are then trimmed as indicated in Fig. 3. The fittings 10—11 may be comparatively light, and they do not extend down over the head of the broom so that the fittings do not add materially to the weight. The outer ends of the two portions 10 are held together by a suitable ferrule 21. The handle 22 is pointed at its inner end so that, when it is screwed to position, it will enter the mass of corn and force the lips 30 apart thus tending to swing the outer ends of the stem members 10 together and clamp them upon the handle.

By the method described I am able to assemble the corn without preliminary wetting and consequently there is no shrinking and loosening of the corn after the broom is completed.

I claim as my invention:

1. A broom comprising a pair of half-fittings each comprising a hollow handle-receiving member and a pair of hollow diverging arms, a mass of corn having the butts arranged between the arms of the fittings, fastening members extending through the fittings, and a pair of wisps of corn having their butt ends laid inside of the end fastening members and their soft ends doubled back upon the mass outside of said fastening members, and means other than the fittings for binding the corn together at a point beyond the fittings.

2. A broom comprising a pair of half-fittings each comprising a threaded hollow handle-receiving member, a pair of hollow diverging arms and a lip opposite the handle-receiving member, a mass of corn having the butts arranged between the arms of the fittings, fastening members extending through the fittings, and a pair of wisps of corn having their butt ends laid inside of the end fastening members and their soft ends doubled back upon the mass outside of said fastening members, means other than the fittings for binding the corn together at a point beyond the fittings, and a handle screwed into the fittings and having a tapered end adjacent said lips.

3. A broom comprising a pair of half fittings each comprising a hollow handle-receiving member, a pair of hollow arms diverging from the lower end of said handle-receiving member, and a lip arranged in alinement with the handle-receiving member at its inner end, means for clamping said two members together upon the butts of the broom material, and a handle member projected into the handle-receiving members and between the aforesaid lips whereby the handle-receiving members are clamped upon the handle by longitudinal movement of the handle between the lips.

4. A broom comprising a pair of half-fittings each comprising a threaded hollow handle-receiving member, a pair of hollow diverging arms and a lip opposite the handle-receiving member, a mass of corn having the butts arranged between the arms of the fittings, fastening members extending through the fittings, means other than the fittings for binding the corn together at a point beyond the fittings, and a handle screwed into the fittings and having a tapered end adjacent said lips.

In witness whereof, I, have hereunto set my hand and seal at Indianapolis, Indiana, this 13th day of June, A. D. one thousand nine hundred and six.

ANDREW J. COCHRAN. [L. S.]

Witnesses:
ARTHUR M. HOOD,
THOMAS W. McMEANS.